(12) United States Patent
Yoon et al.

(10) Patent No.: US 6,510,711 B2
(45) Date of Patent: Jan. 28, 2003

(54) APPARATUS AND METHOD FOR SINTERING A SOL-GEL TUBE USING A FURNACE HAVING A ROTATING CAP

(75) Inventors: Young-Sik Yoon, Kyongsangbukedo (KR); Young-Min Baik, Kyongsangbukedo (KR)

(73) Assignee: Samsung Electronics Co., LTD, Suwon (KR)

( * ) Notice: Subject to any disclaimer, the term of this patent is extended or adjusted under 35 U.S.C. 154(b) by 202 days.

(21) Appl. No.: 09/745,403

(22) Filed: Dec. 22, 2000

(65) Prior Publication Data

US 2001/0005992 A1 Jul. 5, 2001

(30) Foreign Application Priority Data

Dec. 22, 1999 (KR) .............................. 99-60249

(51) Int. Cl.⁷ ..................... C03B 37/012; C03B 37/016
(52) U.S. Cl. ..................... 65/395; 65/428; 65/529; 65/530
(58) Field of Search ................... 65/395, 427, 428, 65/530, 529

(56) References Cited

U.S. PATENT DOCUMENTS

| | | | | |
|---|---|---|---|---|
| 3,902,885 A | * | 9/1975 | Rau .............................. 65/302 |
| 4,389,231 A | * | 6/1983 | Partus ......................... 427/231 |
| 4,741,748 A | * | 5/1988 | Lane et al. ................... 65/144 |
| 4,906,267 A | * | 3/1990 | Lane et al. ................. 219/634 |
| 5,106,401 A | * | 4/1992 | Ishikawa et al. ............... 65/398 |
| 5,133,796 A | * | 7/1992 | Tsuchiya et al. ............... 65/144 |
| 5,158,587 A | * | 10/1992 | Kyoto et al. .................. 65/30.1 |
| 5,423,898 A | | 6/1995 | Terashima et al. ............. 65/381 |
| 5,713,979 A | * | 2/1998 | Nicholson et al. ........ 65/374.13 |
| 5,912,397 A | | 6/1999 | Baik et al. .................... 65/17.2 |
| 5,919,280 A | | 7/1999 | Oh et al. ...................... 65/17.2 |

FOREIGN PATENT DOCUMENTS

| | | | |
|---|---|---|---|
| EP | 232077 A2 * | 8/1987 | |
| EP | 0744383 A1 | 11/1996 | ......... C03B/37/014 |
| JP | 56045846 | 4/1981 | ........... C03B/37/00 |
| JP | 62021725 | 1/1987 | ......... C03B/37/012 |
| JP | 02160636 | 6/1990 | ......... C03B/37/012 |
| JP | 05270850 | 10/1993 | ......... C03B/37/014 |
| JP | 08208261 | 8/1996 | ......... C03B/37/014 |
| JP | 1108689 A2 | 6/2001 | ........... C03B/19/12 |

* cited by examiner

*Primary Examiner*—John Hoffmann
(74) *Attorney, Agent, or Firm*—Steve Cha; Cha & Reiter

(57) ABSTRACT

Disclosed is an apparatus and method for sintering an over-jacketing tube in the zone sintering phase of an optical fiber preform fabrication process using a sol-gel process. The sintering apparatus includes: a processing tube; a gel tube assembly connected to a top rotation cap positioned at the top opening of the processing tube and being rotated at a predetermined rate, a ceramic pin extending downwardly from the center axis of the rotation cap, and a gel tube suspended from the bottom of the ceramic pin and suspended along the same axle of the processing tube; and a movable furnace initially positioned at the bottom of the processing tube and translating in a vertical direction along the processing tube for thermally treating the gel tube.

10 Claims, 7 Drawing Sheets

US 6,510,711 B2

1

APPARATUS AND METHOD FOR SINTERING A SOL-GEL TUBE USING A FURNACE HAVING A ROTATING CAP

CLAIM OF PRIORITY

This application claims priority to an application entitled "Apparatus and Method for Sintering Over-Jacketing Tube in Zone Sintering Phase of Optical Fiber Preform Fabrication Process Using Sol-Gel Process" filed with the Korean Industrial Property Office on Dec. 22, 1999 and there duly assigned Serial No. 99-60249.

BACKGROUND OF THE INVENTION

1. Field of the Invention

The present invention relates generally to a method and apparatus for fabricating a silica-based glass using an optical fiber preform. More particularly, the present invention relates to a method and apparatus for fabricating a transparent substrate tube or an over-jacketing tube by a sol-gel process.

2. Description of the Related Art

In general, a silica-based glass is transparent and chemically inert, and has a high level of thermal stability and strength, and a low thermal expansion coefficient. These valuable characteristics make the silica-based glass useful for an optical fiber preform.

An optical fiber includes a core layer having a predetermined refractive index therein, and a cladding layer having a lower refractive index different from the core such that incident light is totally reflected within the core layer. Normally, in order to fabricate an optical fiber, an optical fiber preform is prepared and thermally treated, then extended to form a strand of optical fiber. The extended optical fiber can be coated to form an optical fiber cable.

Alternatively, an over-cladding or an over-jacketing process can be implemented to obtain an optical fiber preform with a larger diameter that can produce longer optical fibers. Such an optical fiber preform is prepared by either the chemical deposition method or the sol-gel process. The chemical vapor method involves the fabrication of a solid silica-based glass through vapor reaction, but the productivity using this method is low. Also, the chemical vapor method requires operation at a high temperature for the fabrication process which in turn raises fabrication cost due to expensive equipment needed to perform at high temperature. The sol-gel process, however, is more economical and has some advantages of achieving high productivity because of its liquid process, and has capabilities to freely adjust the component formation and process at a relatively low temperature. Moreover, the sol-gel process uses a high purity material as the starting material, and this is very useful for fabricating a high purity silica glass.

The sol-gel process for fabricating the silica glass by using a high purity material is disclosed in U.S. Pat. No. 5,912,397 by Young-Min Baik, titled "High-purity silica glass fabrication method using sol-gel process", and U.S. Pat. No. 5,919,280 by Jeong-Hyun Oh, titled "Method for fabrication silica glass".

In addition, an apparatus and method for sintering a silica-based glass in a sintering furnace are disclosed in detail in U.S. Pat. 5,423,898, titled "Method of lowering and raising an optical fiber preform in a sintering furnace." This patent discloses a sintering phase of the sol-gel process. Another apparatus for fabricating a transparent silica glass preform which is disclosed in the U.S. Pat. No. 5,423,898 by

2

Masami Terashima, et al., includes a fixed furnace body, a furnace tube, and a porous silica glass body that moves longitudinally along the furnace tube. The furnace and the furnace tube are fixed and only the transparent silica-based glass is vertically movable. This type of configuration has some drawbacks. As the furnace and the furnace tube are permanently fixed, the silica glass has to move along the furnace tube and around the furnace, then the sintered glass is removed. Such configuration requires a sintering tower with the height that reaches almost 10 m, thus, it becomes very difficult to maintain the alignment of the equipment and the silica glass during the fabrication stage since the silica glass subject has to be moved. Also, manufacturing costs of the equipments tend to increase to implement this type of equipment. Furthermore, the height of a factory zenith is determined depending on the height of the equipment; hence, maintenance and usage costs are costly, which in turn raises the production cost.

SUMMARY OF THE INVENTION

It is, therefore, an object of the present invention to provide an apparatus and method for sintering an over-jacketing tube, in which the height of a sintering tower required in the sintering process is lowered compared to the conventional art system, so as to easily align of the equipment and the processing tube.

It is another object of the present invention to provide an apparatus and method for sintering an over-jacketing tube, in which the manufacturing cost of a sintering tower that is required in the sintering process is lowered compared to the conventional art system.

It is still another object of the present invention to provide an apparatus and method for sintering an over-jacketing tube, in which maintenance and operation costs of the sintering tower are less than the conventional art system.

To achieve the above objects, there is provided an apparatus and method for sintering an over-jacketing tube. The apparatus for sintering the over-jacketing tube includes a tube, a gel tube disposed within the tube, and a furnace for thermally treating the gel tube. The apparatus includes a processing tube composed of quartz; a gel tube assembly including a top rotation cap positioned at the top of the processing tube, for sealing the inside of the processing tube and rotating at a regular peripheral velocity, a ceramic pin elongated downward from an axis of the top rotation cap, and a gel tube suspended from a bottom of the ceramic pin and disposed on the same axle within the processing tube; and a movable furnace initially disposed on the bottom of the processing tube, and moving upward along the processing tube after the gel tube assembly is inserted into the processing tube so as to thermally process the gel tube.

Accordingly, the method for sintering the over-jacketing tube with a device of the type having a processing tube; a gel tube assembly having a top rotation cap and a prepared gel tube, from which the prepared gel tube is suspended, and disposed within the processing tube; and a furnace for thermally processing the gel tube, the method comprising the steps of: inserting the gel tube assembly into an axial bottom of the processing tube; injecting helium gas into the inside of the processing tube; rotating the gel tube at a regular peripheral velocity; moving the furnace along the processing tube in a vertically upward direction and therefore thermally processing the gel tube; and, stopping the injection of the helium gas as well as moving the furnace to its initial position at a high velocity after thermally processing the gel tube.

BRIEF DESCRIPTION OF THE DRAWINGS

The above and other objects, features, and advantages of the present invention will become more apparent from the following detailed description when taken in conjunction with the accompanying drawings, in which.

DETAILED DESCRIPTION OF THE PREFERRED EMBODIMENT

A preferred embodiment of the present invention will be described herein below with reference to the accompanying drawings. For the purpose of clarity, well-known functions or constructions are not described in detail since they would obscure the invention in unnecessary detail.

Figure 1:
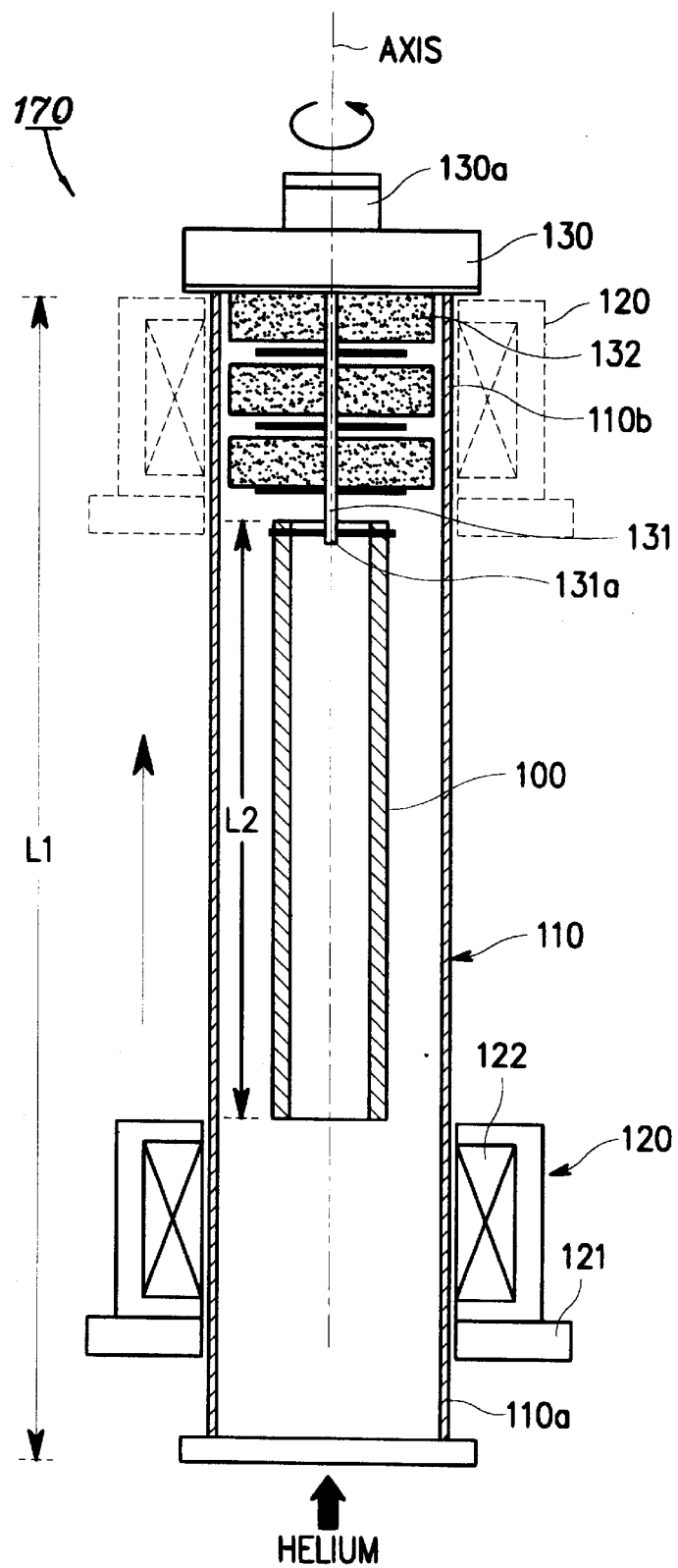
FIG. 1 is a view illustrating the construction of an apparatus for sintering an over-jacketing tube according to a preferred embodiment of the present invention; and, FIGS. 2a through 2f are views illustrating the order of fabricating an over-jacketing tube using the sintering apparatus according to a preferred embodiment of the present invention.

FIG. 1 is a side view illustrating the apparatus for sintering an over-jacketing/over-cladding tube according to the preferred embodiment of the present invention. Referring to FIG. 1, the inventive apparatus 170 is utilized in the sintering phase of a sol-gel process. Namely, the inventive apparatus 170 will be used when manufacturing an over-jacketing tube formed of silica glass using the sol-gel process, which involves providing silica particles in water to form a sol, and the formed sol is subject to an aging treatment. Then, the aged sol is poured into a mold for gelation, and the gel is subsequently removed from the mold and dried. Thereafter, the dried gel is thermally treated to remove organic substances and sintering is performed to produce an over-jacketing tube. To this end, the sintering apparatus 170 is used to produce a substrate tube or over-jacketing tube made of silica glass.

The sintering apparatus 170 sinters a gel tube 100, which has been treated at a relatively low temperature, by inserting the get tube 100 into a processing tube 110. The furnace 120 is moved in an upward direction along the processing tube 110 for sintering purposes. The length of the processing tube 110 is about 2.8 m. The length of the gel tube 100 is about 1.3 to 1.5 m, while the length of the over-jacketing tube after being sintered is about 1 m. The respective internal and external diameters of the top and bottom of the gel tube 100 are different from each other. The diameter of the gel tube 100 becomes narrower in an upward direction and has an inclination angle of approximately 2 degrees. A tube which has been treated prior to the sintering phase is hereinafter referred to as the gel tube 100, whereas after the sintering phase the tube is referred to as an over-jacketing tube.

The sintering apparatus 170 according to the present invention includes: a hollow processing tube 110 for sintering a low-heat treated gel tube 100; a top rotation cap 130 for sealing the top of the processing tube 110 and for rotating the suspended gel tube 100; and, a furnace 120 moving simultaneously in a vertical direction along the processing tube 110 for thermal application. When the gel tube 100 is inserted into the processing tube 110, the gel tube 100 is vertically suspended in the processing tube 110. The furnace 120 includes a heater made of graphite.

The top rotation cap 130 rotates in an arrow direction at a relatively low velocity around the axis. The furnace 120 moves vertically in an arrow direction at a relatively low velocity for thermally treating the gel tube 100. The furnace 120 is initially positioned near the carriage 121 and makes a longitudinal upward movement. Basically, the initial position of the furnace 120 is at the bottom portion 110a of the processing tube 110 and finished at the top portion (as indicated by a dotted line) of the gel tube 100 after undergoing thermal treatment. When the gel tube 100 thermal treatment is completed, the furnace 120 is returned to its initial position at a faster rate.

The top rotation cap 130 is located on the top of the processing tube 110 and rotatable at a steady speed by a rotating means (not shown). The top rotation cap 130 and the top of the processing tube 110 include a ceramic rotation plate (not shown). The function of the ceramic rotation plate is for a sealing application, while allowing the top rotation cap 130 to rotate on the top end of the processing tube 110.

The gel tube 100 is suspended from the top rotation cap 130 through the ceramic pin 131, and coupled to the bottom end 131a of the ceramic pin 131. A plurality of quartz insulation materials 132 are installed along the ceramic pin 131. The quartz insulation material 132 blocks the heat applied by the furnace 120.

The method for sintering the over-jacketing tube according to the present invention includes the steps of: injecting helium gas into the inside of the processing tube 110, so as to remove gas cavities in the gel tube 100; rotating the gel tube disposed within the processing tube 110 by rotating the top rotation cap 130; and moving the furnace 120 in a upward direction to apply thermal treatment to the gel tube 100. Here, the furnace 120 thermally treats the gel tube 100 through one upward movement.

The method of sintering a gel tube 100 according to the present invention will be described herein below with reference to FIGS. 2a through 2f. The processing tube 110 and the holding device (not shown) are installed according to a sintering tower (not shown). It should be noted that the inventive apparatus according to the present invention can be introduced in the process of fabricating a cylindrical optical fiber preform of silica glass as well as in the process of fabricating a tube materialized of the silica-based glass.

Figure 2A:
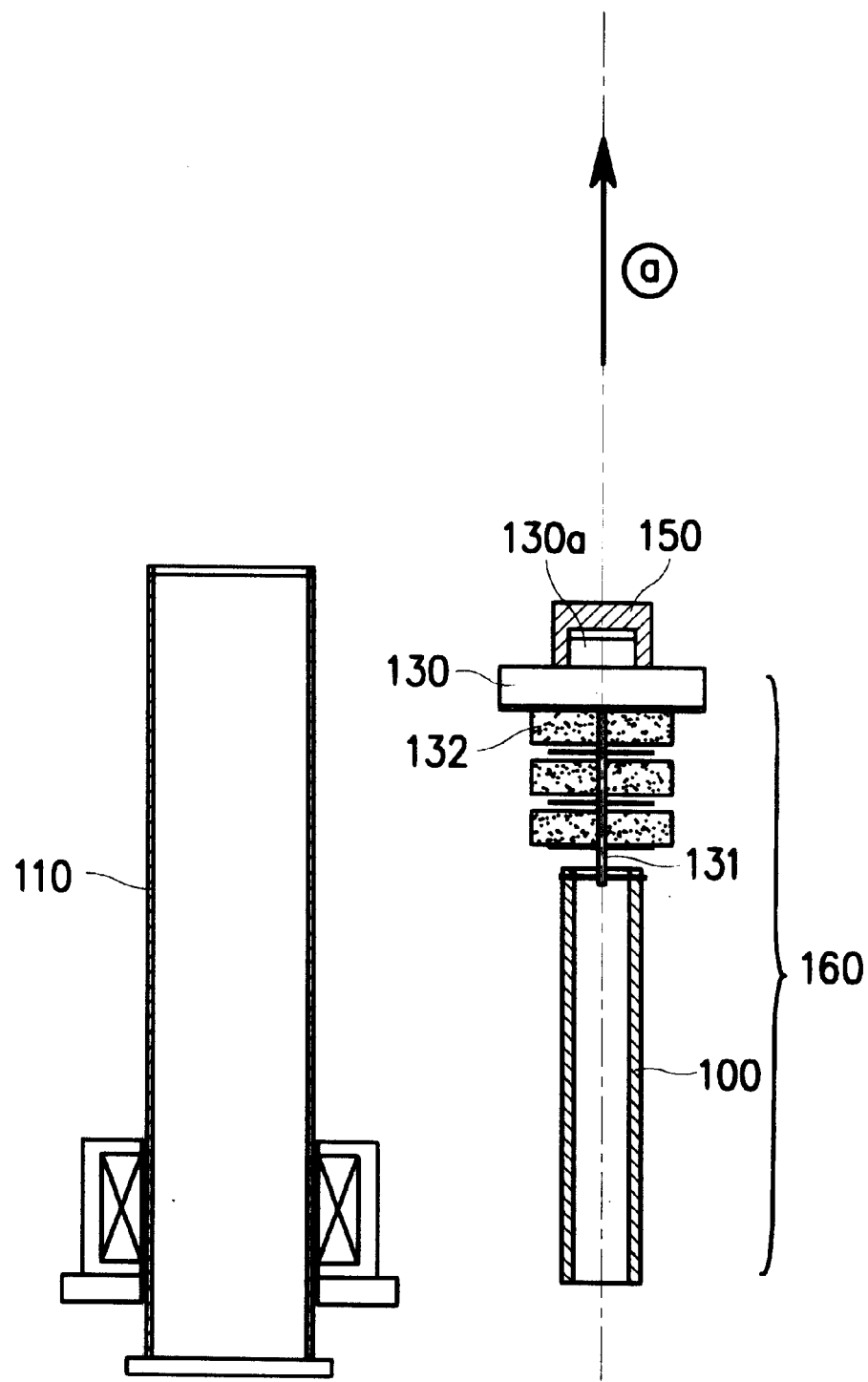

Referring to FIG. 2a, a gel tube assembly is prepared to include a previously low-heat treated gel tube 100 which is suspended from a top rotation cap 130. The gel tube assembly 160 includes the top rotation cap 130; a ceramic pin 131 installed on the axial bottom of the top rotation cap 130; a gel tube 100 suspended from the bottom of the ceramic pin 131; and 10 one or more quartz insulation materials 132 installed between the top rotation cap 130 and the gel tube 100. As shown in FIG. 2a, three quartz insulation materials 132 are vertically positioned on the ceramic pin 131 with intervals. However, one or more quartz insulation materials 132 may be installed in the ceramic pin 131. The quartz insulation material 132 is of a circular disk shape.

Following the phase of preparing the gel tube assembly 160, a top 130a of the top rotation cap 130 is connected to a vertically or horizontally movable holding unit 150, and then moved upward, or in an arrow direction (a) by the vertically or horizontally movable holding unit 150. The movable holding unit 150 is driven by a hydraulic pressure cylinder, which is not drawn. The vertically and upwardly movable gel tube assembly 160 is drawn in FIG. 2b.

Figure 2B:
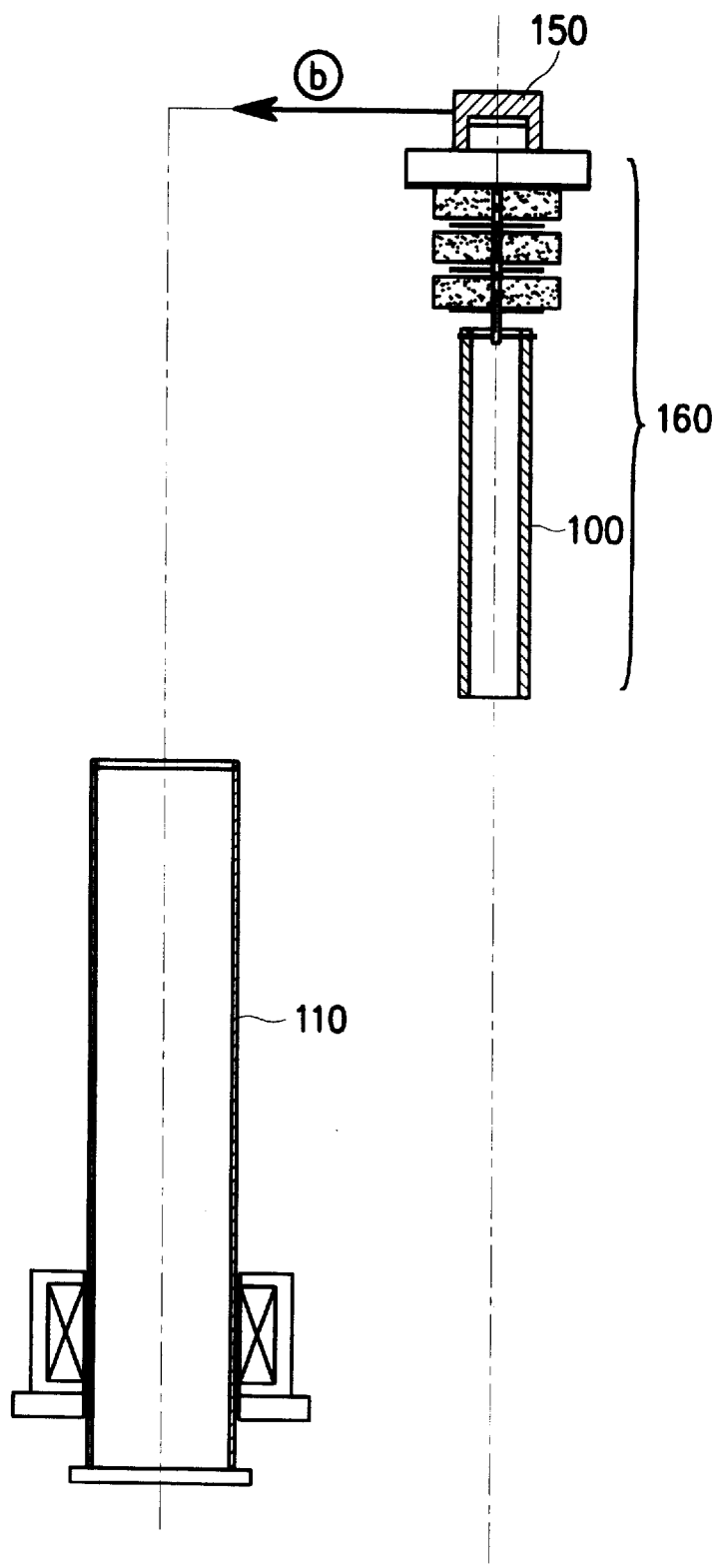

As shown in FIG. 2b, the gel assembly moved upward by the holding unit 150 is moved in an arrow direction (b) (horizontally), so as to be inserted into the processing tube 110. The holding unit 150 is vertically or horizontally movable. The axis of the gel tube 100 is horizontally moved by the holding unit 150, to a point at which the axis of the processing tube 110 is on the same axle therewith. The gel tube assembly 160 horizontally moved by the holding unit 150 is drawn in FIG. 2c.

Figure 2C:
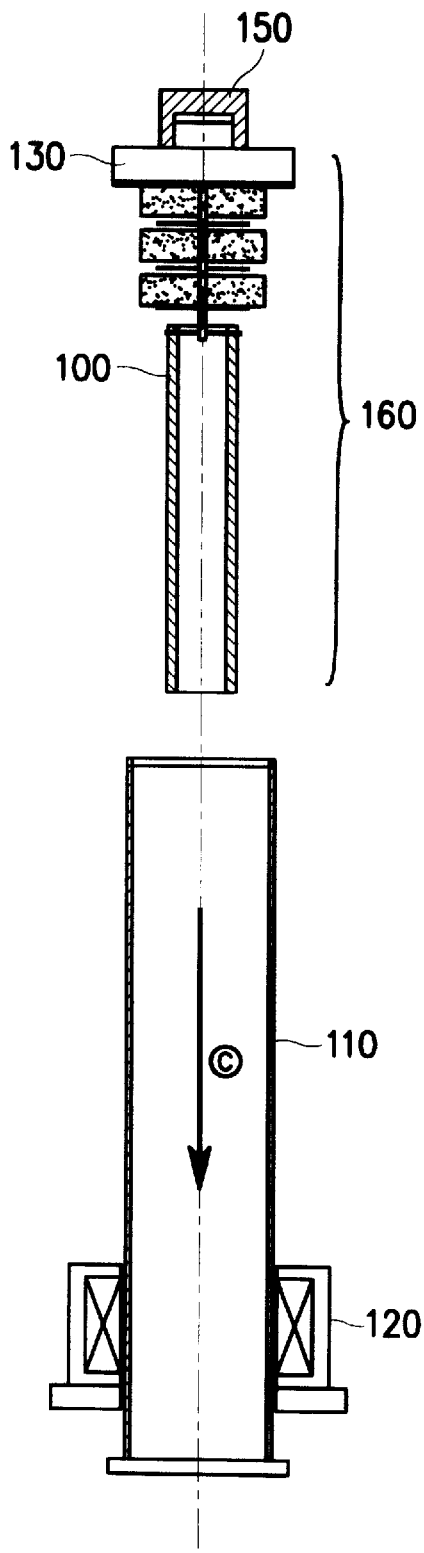

Referring to FIG. 2c, the gel tube horizontally moved while being suspended from the top rotation cap 130 is moved to a point at which it is on the same axle with the processing tube 110. The gel tube assembly 160 is moved in an arrow direction (c) by the holding unit 150, and completely inserted into the processing tube 110. The furnace 120 is located on the bottom of the processing tube 110. A view showing that the gel tube 100 is completely inserted into the processing tube 110 is drawn in FIG. 2d.

Figure 2D:
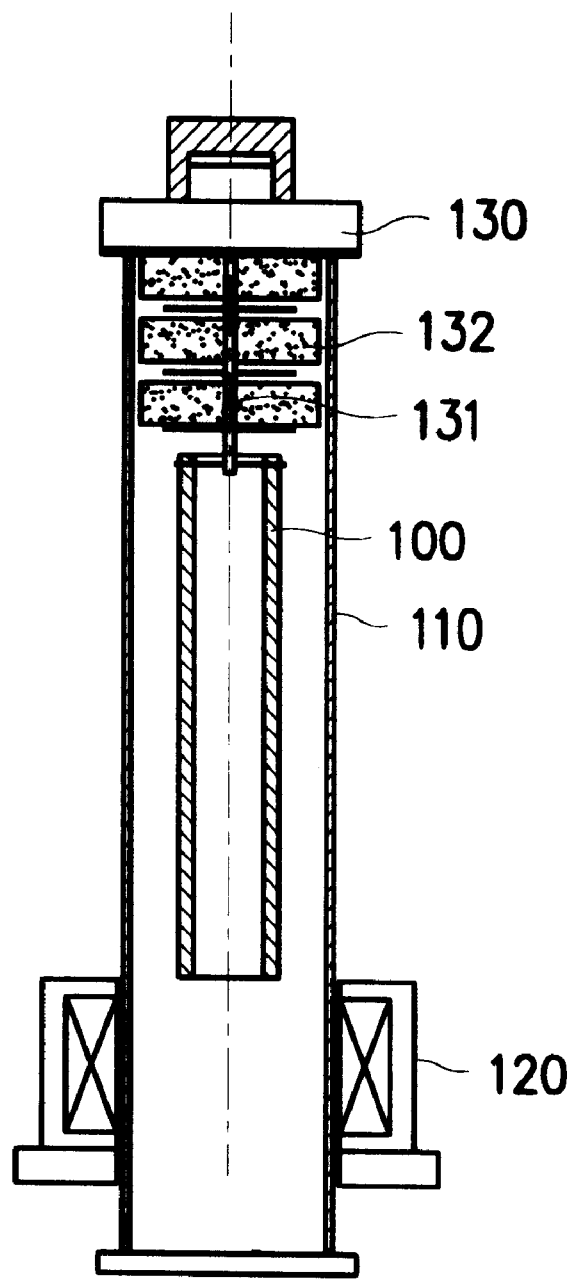

As shown in FIG. 2d, the furnace is disposed around the gel tube 100 inserted into the processing tube 110 and is also positioned to surround the processing tube 110 in the bottom direction of the gel tube 100. The top rotation cap 130 is disposed on the top of the processing tube 110 for sealing the inside of the processing tube.

Figure 2E:
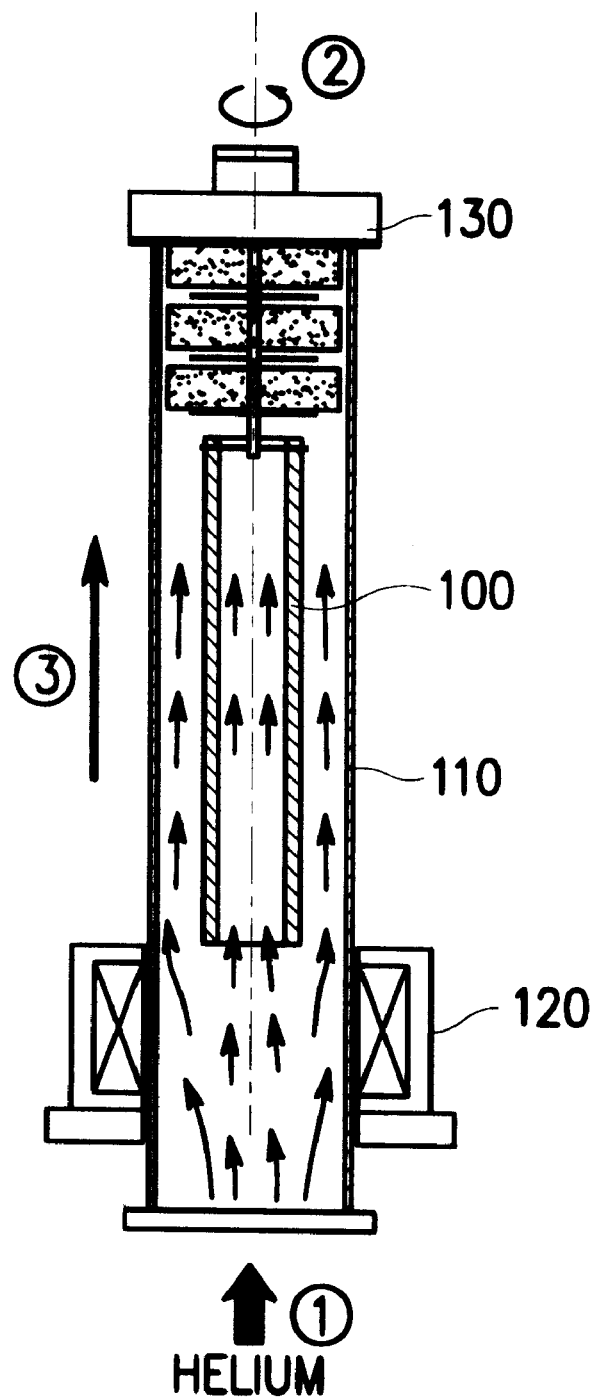
Figure 2F:
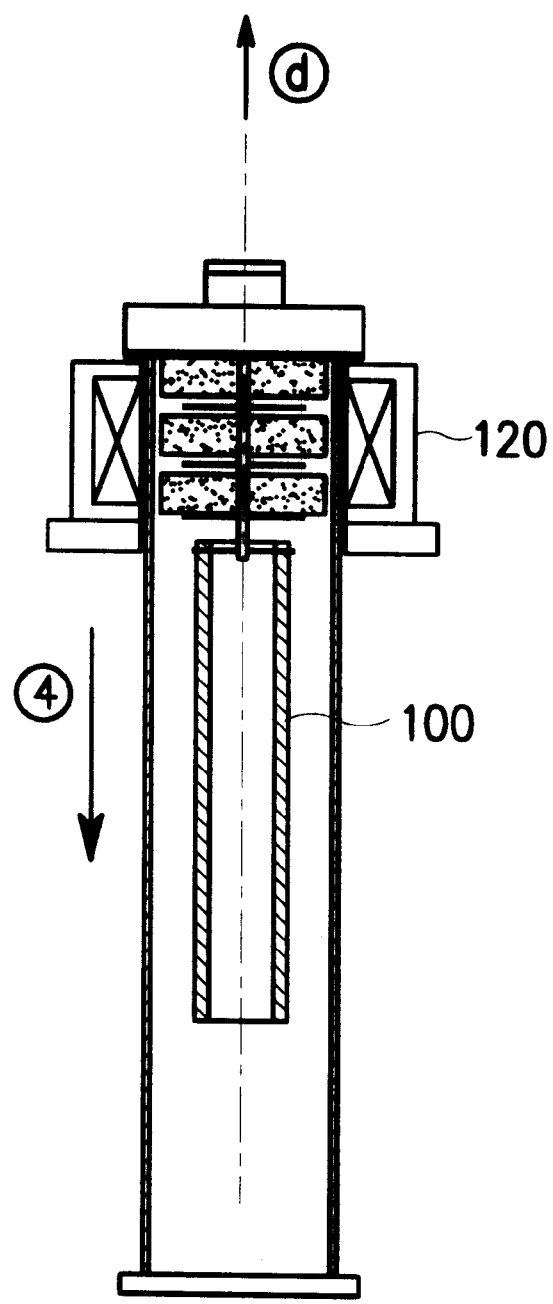

Then, as drawn in FIG. 2e, the gel tube assembly 160 is inserted into the inside of the processing tube 110, a helium gas is inserted into the inside of the processing tube 110 in the direction (1) to eliminate gas cavities within the processing tube 110, and sequentially the top rotation cap 130 rotates in the arrow direction (2). The helium gas 100 is injected upwardly toward the processing tube. In other words, the helium gas flows from the bottom to the top. After the gel tube 100 rotates within the processing tube 110 at a regular peripheral velocity, the furnace 120 is moved upward (in the arrow direction (3)) at a regular peripheral velocity. Here, the temperature for thermally processing the furnace 120 is 1450 degree C., and a reference velocity of proceeding the processing is 15 cm/hr. The furnace 120 heating temperature is elevated to 1400 degree C. when it is initially elevated. When the furnace 120 reaches 1380 degrees C., the furnace 120 is moved upward (in the arrow direction (3)) at a velocity of 18 cm/hr. When the furnace 120 is elevated from 1380 degree C. to 1450 degrees C., the elevation velocity is 1 degree C/hr. Furthermore, when the furnace reaches 1440 degrees C., the proceeding velocity of the furnace 120 is changed to 15 cm/hr, completing the proceeding. The furnace 120 sinters the gel tube by thermally processing the same, and the sintering phase is competed as shown in FIG. 2f. To be specific, the sintering apparatus according to the present invention fabricates the gel tube as an over-jacketing tube 100. Here, the heat conducted to the furnace 120 is blocked by the quartz insulation materials 132 and unable to be injected into the top rotation cap 130.

After the gel tube 100 sintering phase is completed as shown in FIG. 2f, the furnace 120 is moved downward (in the arrow direction (4)) at a high velocity of 500 mm/min, an injection of the helium gas is stopped, and the gel tube assembly is horizontally moved in an arrow direction (d) becoming the same state as in FIG. 2c. Next, the gel tube assembly 160 is horizontally moved and becomes the same state as in FIG. 2b, whereas the gel tube assembly is also moved downward and hence becomes the same state as in FIG. 2a, thereby completing the process for sintering the over-jacketing tube. The thermally processing phase for sintering according to the present invention enables fabrication of an over-jacketing tube of 250 km, and a cross sectional area distribution according to its length is possibly (maximum value−minimum value)/average sectional area*100 less than equal to 5%.

While the invention has been shown and described with reference to a certain preferred embodiment thereof, it will be understood by those skilled in the art that various changes in form and detail may be made therein without departing from the spirit and the scope of the invention as defined by the appended claims. Especially, the thermally processing temperature and the proceeding velocity of the furnace are only certain examples, and therefore the present invention is not limited to them. Furthermore, according to the present invention, the thermally processing phase is proceeded with once vertical movement of the furnace. However, one or more reciprocations of the furnace are possible for the thermally processing phase. Accordingly, the thermally processing temperature and the proceeding velocity may be changed based on the variable.

As described above, according to the present invention, as the height of the equipment becomes lower, easier maintenance of high accuracy in the equipment can be achieved, serving to decrease the equipment manufacturing cost. In particular, the lower the height of the equipment, the lower the height of the factory zenith, thereby reducing the equipment maintenance and usage costs.

What is claimed is:

1. An apparatus for sintering an over-jacketing tube, comprising:
    a processing tube having a top opening and a bottom opening;
    a rotable means having a rotation cap, a ceramic rod connected to said rotation cap around the center axis of said rotation cap for clamping a pre-prepared gel tube at the bottom end of said ceramic rod, a plurality of heating insulation elements disposed along said rod element in a horizontal orientation, said rotable means adaptable to seal the top opening of said processing tube; and,
    a heating means slidably movable in a vertical direction along the lateral side of said processing tube for applying thermal treatment to said gel tube after said gel tube is enclosed in said processing tube.

2. The apparatus of claim 1, wherein said heating insulation elements are comprised of quartz.

3. The apparatus of claim 2, further comprising a driving means for turning said rotable means at a predetermined rotating speed.

4. The apparatus of claim 1, wherein a helium gas is injected upwardly to the inside of said processing tube from the bottom opening of said processing tube for eliminating gas cavities in said gel tube.

5. The apparatus of claim 1, wherein said furnace is translated once in an upward direction along said processing tube for thermally treating said gel tube enclosed in said processing tube.

6. The apparatus of claim 1, wherein said heating means applies the thermal treatment at a predetermined temperature.

7. A method for sintering an over-jacketing tube by a sintering apparatus of the type having a processing tube, a rotation means having a rotation cap for attaching a pre-prepared gel tube, and a movable furnace for thermally treating said gel tube, the method comprising the steps of:
    (a) inserting said gel tube suspended and attached to said rotation means into said processing tube to such a position that said rotation cap is sealed to the top opening of said processing tube;
    (b) injecting a helium gas into said processing tube;
    (c) rotating said gel tube at a first predetermined speed;
    (d) slidably translating said furnace located at the bottom of said processing tube in a upward direction along said processing tube for applying thermal treatment to said gel tube enclosed in said processing tube;

(e) stopping the injection of said helium gas into said processing tube; and, (f) returning said furnace back to the bottom of said processing tube at a second predetermined speed for a subsequent thermal application.

8. The method of claim 7, further comprising a step of removing said gel tube from said processing tube, and detaching said gel tube from said rotation cap of said rotation means.

9. The method of claim 7, wherein said helium gas is injected upwardly into said processing tube through the bottom of said processing tube.

10. The method of claim 7, wherein said furnace is translated once in an upward direction along said processing tube for thermally treating said gel tube enclosed in said processing tube.

* * * * *